US011858152B2

(12) United States Patent
Petrelli

(10) Patent No.: US 11,858,152 B2
(45) Date of Patent: Jan. 2, 2024

(54) MOUNTING ASSEMBLY AND A HAIR CUTTING APPLIANCE

(71) Applicant: KONINKLIJKE PHILIPS N.V., Eindhoven (NL)

(72) Inventor: Marcus Cornelis Petrelli, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/791,247

(22) PCT Filed: Sep. 17, 2021

(86) PCT No.: PCT/EP2021/075605
§ 371 (c)(1),
(2) Date: Jul. 7, 2022

(87) PCT Pub. No.: WO2022/069257
PCT Pub. Date: Apr. 7, 2022

(65) Prior Publication Data
US 2023/0226705 A1 Jul. 20, 2023

(30) Foreign Application Priority Data
Oct. 1, 2020 (EP) .................................... 20199509

(51) Int. Cl.
*B26B 19/04* (2006.01)
*B26B 19/06* (2006.01)
*B26B 19/38* (2006.01)

(52) U.S. Cl.
CPC .......... *B26B 19/048* (2013.01); *B26B 19/063* (2013.01); *B26B 19/386* (2013.01)

(58) Field of Classification Search
None
See application file for complete search history.

(56) References Cited

U.S. PATENT DOCUMENTS

2003/0061718 A1 4/2003 Dansreau
2010/0043242 A1 2/2010 Stevens
(Continued)

FOREIGN PATENT DOCUMENTS

CN 114260947 A * 4/2022
CN 115556148 A * 1/2023
(Continued)

OTHER PUBLICATIONS

International Search Report and Written Opinion dated Nov. 10, 2021 for International Application No. PCT/EP2021/075605 Filed Sep. 17, 2021.

*Primary Examiner* — Hwei-Siu C Payer

(57) ABSTRACT

According to an aspect, there is provided a mounting assembly (12) for a hair cutting appliance, the mounting assembly comprising a head (16) for receiving a cutting unit (14); and a body (18). The head is mounted to the body by a four-bar linkage (20) having a coupler link (22) associated with the head, a frame link (24) associated with the body, and two arms (26) extending therebetween. The frame link is connected to each arm at respective joins (28), and the coupler link is connected to each arm at respective joins. Pivoting movement of the arms about parallel linkage axes (30) passing through each join permits rotation of the coupler link relative to the frame link about a virtual pivot (32). One of the coupler link and the frame link is a first link coupled to the arms by two-degree-of-freedom joins, thereby permitting the arms and the other of the frame link and the coupler link to further pivot in unison relative to the first link about a rotation axis (34) perpendicular to the linkage axes.

20 Claims, 5 Drawing Sheets

(56) References Cited

U.S. PATENT DOCUMENTS

| | | | | |
|---|---|---|---|---|
| 2013/0074344 | A1 | 3/2013 | Shimizu | |
| 2017/0290606 | A1 | 10/2017 | Yiu | |
| 2018/0085935 | A1* | 3/2018 | Erndt | B26B 19/048 |
| 2018/0085936 | A1* | 3/2018 | Erndt | B26B 19/048 |
| 2018/0085937 | A1* | 3/2018 | Erndt | B26B 19/3846 |
| 2023/0226705 | A1* | 7/2023 | Petrelli | B26B 19/063 30/223 |

FOREIGN PATENT DOCUMENTS

| | | | |
|---|---|---|---|
| DE | 202006011254 | U1 | 12/2006 |
| DE | 10200801132 | A1 | 1/2010 |
| EP | 0903205 | A1 | 3/1999 |
| EP | 3300849 | A1 | 4/2018 |
| EP | 4 119 311 | A1 * | 1/2023 |
| EP | 4 137 282 | A1 * | 2/2023 |
| JP | H0422388 | A | 1/1992 |
| WO | 2015/074882 | | 5/2015 |

* cited by examiner

MOUNTING ASSEMBLY AND A HAIR CUTTING APPLIANCE

CROSS REFERENCE TO RELATED APPLICATIONS

This application is the U.S. National Phase application under 35 U.S.C. § 371 of International Application No. PCT/EP2021/075605 filed Sep. 17, 2021, which claims the benefit of European Patent Application Number 20199509.9 filed Oct. 1, 2020. These applications are hereby incorporated by reference herein.

FIELD OF THE INVENTION

The present application relates to a mounting assembly for a hair cutting appliance, the hair cutting appliance, and a kit of parts for making the mounting assembly.

BACKGROUND OF THE INVENTION

Hair cutting appliances such as manual or electronic razors for shaving typically comprise a body and a head with a blade or cutting unit. The head can typically pivot relative to the body about a single axis, to permit conformance of the head to the shape of the object being shaved, for example in WO 2015/074882.

In some arrangements, the head is configured to swing about two orthogonal axes relative to the body, such as in US 2013/0074344. However, such arrangements are bulky and require multiple superimposed mechanisms to allow such movement.

SUMMARY OF THE INVENTION

According to a first specific aspect, there is provided a mounting assembly for a hair cutting appliance, the mounting assembly comprising: a head for receiving a cutting unit; and a body. The head is mounted to the body by a four-bar linkage having a coupler link associated with the head, a frame link associated with the body, and two arms extending therebetween. The frame link is connected to each arm at respective joins, and the coupler link is connected to each arm at respective joins, wherein pivoting movement of the arms about parallel linkage axes passing through each join permits rotation of the coupler link relative to the frame link about a virtual pivot. One of the coupler link and the frame link is a first link, and the other of the coupler link and frame link is a second link, wherein the first link is coupled to the arms by two-degree-of-freedom joins, thereby permitting the arms and the second link to further pivot in unison relative to the first link about a rotation axis having a component in a direction perpendicular to the linkage axes.

The frame link may be the first link coupled to the arms by two-degree-of-freedom joins, thereby permitting the arms and the coupler link to pivot in unison relative to the frame link about the rotation axis.

The coupler link may be coupled to the arms by respective semi-annular bearing elements mounted to the coupler link. Each of the arms may comprise a bearing recess configured to receive the respective bearing element and to cooperate with the respective bearing element to permit pivoting movement between the coupler link and the arm about the respective linkage axis.

At least one bearing element may comprise a bearing stop which is configured to abut against the respective arm to limit pivoting movement of the arm relative to the coupler link about the linkage axis to thereby limit rotation of the head relative to the body about the virtual pivot.

The frame link may be coupled to the arms by respective ball-and-socket joins to permit the arms and the coupler link to pivot in unison relative to the frame link about the rotation axis.

A ball of the ball-and-socket join may be mounted to the frame link. Each of the arms may comprise a socket to receive the respective ball to permit the arms and the coupler link to pivot in unison relative to the frame link about the rotation axis.

The four-bar linkage may comprise a body stop, wherein the body stop may be configured to abut against one of the body, the frame link or at least one arm to limit pivoting movement of the arms and the coupler link in unison about the rotation axis.

Each arm may comprise at least two diverging strands to form a T, V, U or Y shape, such that each arm is coupled to the coupler link at two points, spaced apart along an axis parallel to the linkage axes.

The mounting assembly may comprise a first biasing mechanism configured to bias the coupler link to a first equilibrium position about the virtual pivot. The first biasing mechanism may comprise a torsion spring mounted to the coupler link, and an extension of the torsion spring connected to a respective arm.

The mounting assembly may comprise a second biasing mechanism configured to bias the arms and the coupler link in unison, about the rotation axis with respect to the frame link, to a second equilibrium position.

The second biasing mechanism may comprise a pair of leaf springs mounted to the frame link on either side of a respective join between the frame link and a respective arm, each leaf spring being received in the respective arm to bias the arm to the second equilibrium position.

The rotation axis may be perpendicular to the linkage axes.

According to a second aspect, there is provided a hair cutting appliance comprising a mounting assembly in accordance with the first aspect, and a cutting unit mounted to the head.

According to a third aspect, there is provided a kit of parts for making a mounting assembly according to the first aspect, the kit of parts comprising: the head and an associated coupler link, the body and an associated frame link; and the arms of the four-bar linkage. The arms, the frame link, and the coupler link are configured to couple the arms to the coupler link at respective joins and to the frame link at respective joins to permit pivoting movement about respective parallel linkage axes passing through each join. One of the frame link and the coupler link is a first link, wherein the first link and the arms are configured to be coupled together by two-degree of freedom joins, thereby permitting the arms and the other of the coupler link and the frame link to further pivot in unison relative to the first link about the rotation axis.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
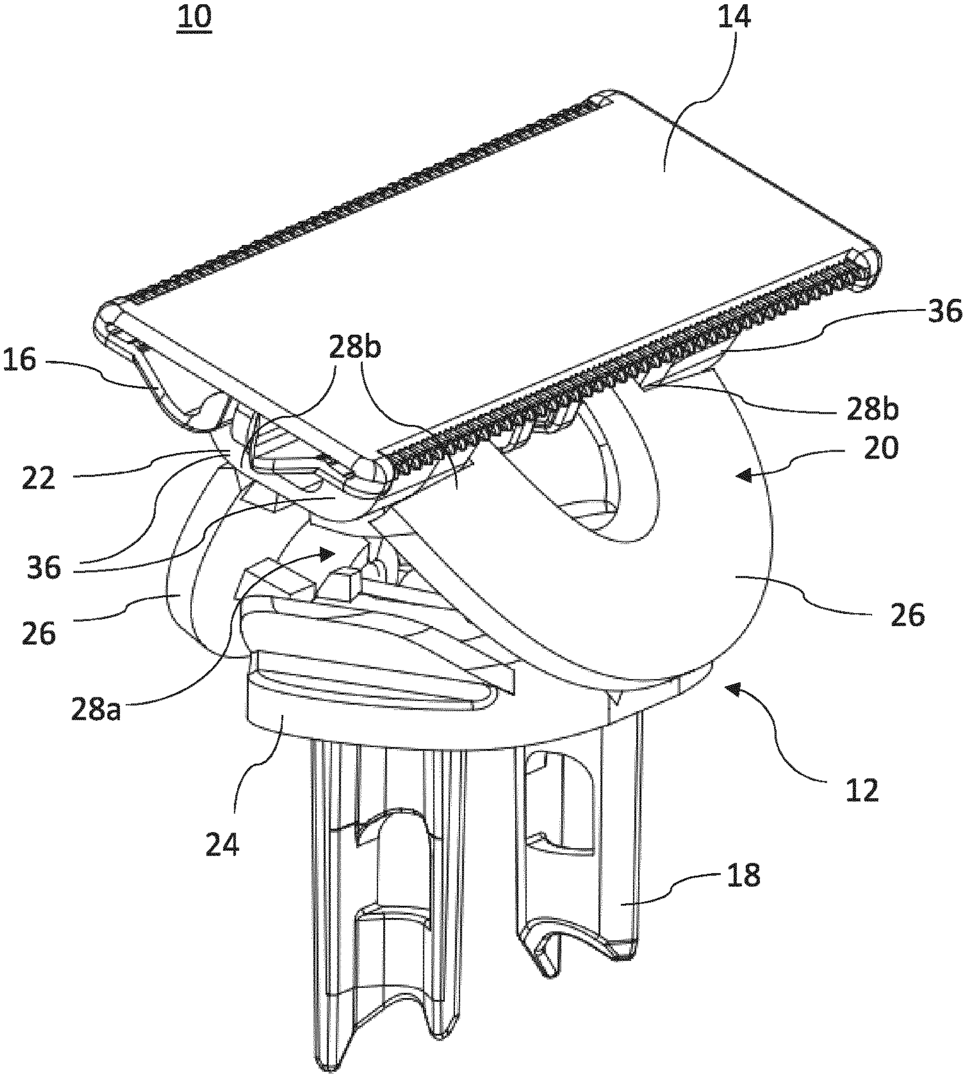
FIG. 1 schematically shows an oblique view of a hair cutting appliance.
Figure 2:
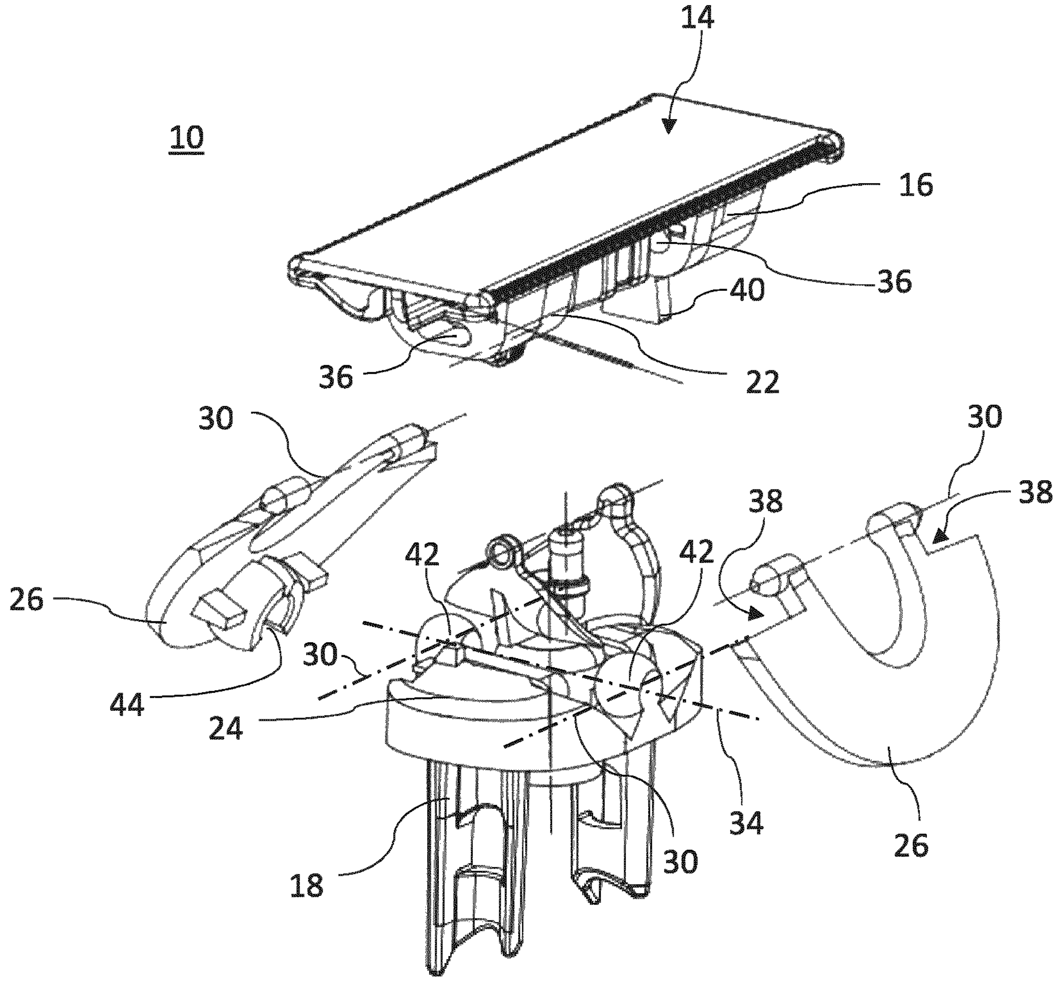
FIG. 2 schematically shows an exploded view of the part of the hair cutting appliance.
Figure 3:
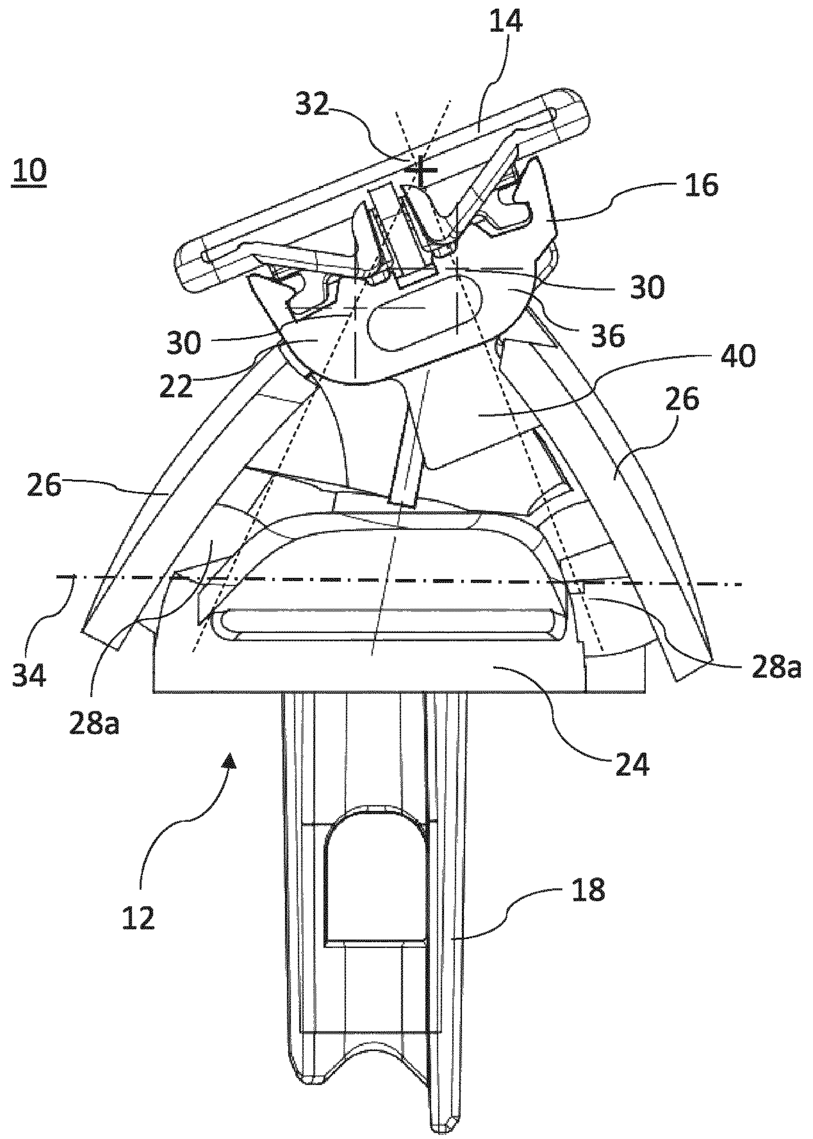
FIG. 3 schematically shows a side view of the hair cutting appliance.

FIGS. 1-3 show different views of a hair cutting appliance 10 comprising a mounting assembly 12 and a cutting unit 14. The cutting unit 14 is mounted on the mounting assembly 12, and is configured to cut hairs. In this example, the cutting unit 14 comprises a stationary guard blade and a reciprocating cutter blade which are configured together to cut hairs. In other examples, the cutting unit may simply comprise one or multiple blades fixed within a guard.

The mounting assembly 12 comprises a head 16 for receiving the cutting unit 14 and a body 18 for interfacing with a handgrip (not shown) by which to hold the mounting assembly 12. The head 16 is mounted to the body 18 by a four-bar linkage 20.

The four-bar linkage 20 comprises a coupler link 22, a frame link 24 and two arms 26 extending between the coupler link 22 and the frame link 24 (best shown in FIG. 3), where each arm 26 is one bar of the four-bar linkage 20, the coupler link 22 is one bar of the four-bar linkage 20 and the frame link 24 is one bar of the four-bar linkage 20. The coupler link 22 is associated with the head 16, and the frame link 24 is associated with the body 18. In this example, the coupler link 22 is a part of the head 16 and the frame link 24 is a part of the body 18. In other examples, the coupler link may be separate from the head, but may be configured to be fixedly attached to the head, and the frame link may be separate from the body, but may be configured to be fixedly attached to the body.

The coupler link 22 is connected to the arms 26 at respective joins 28, and the frame link 24 is connected to the arms 26 at respective joins 28 to form the four-bar linkage 20. Each join 28 therefore provides a connection between two bars of the four-bar linkage 20, and permits pivoting of one bar relative to the other bar about a linkage axis 30 through the respective join 28. The linkage axes 30 through all of the joins 28 are parallel to one another to permit movement of the bars of the four-bar linkage in a plane perpendicular to the linkage axes 30.

The frame link 24 is connected to each arm 26 at respective frame joins 28*a*, and the coupler link 22 is connected to each arm 26 at respective coupler joins 28*b*. The arms 26 comprise two diverging strands to form a U-shape such that the two ends of each U-shaped arm 26 are connected to the coupler link 22 at two coupler joins 28*b*, spaced apart along the an axis parallel to a linkage axis 30. The centre of each arm 26 at the inflection point of the U-shaped arm 26 is connected to the frame link 24 at a single frame join 28*a*. The coupler link 22 is therefore supported by the arms 26 at four coupler joins 28*b* in total.

In other examples, each arm may comprise a single strand to form an I-shape such that the coupler link is supported by the arms at only two coupler joins in total, or the arms may comprise more than two diverging strands so that the coupler link is supported by the arms at more than two coupler joins per arm. Each arm may have a different number of diverging strands to support the coupler link at, for example 3 or 5 coupler joins. In yet further examples, the arms may comprise two diverging strands in the form of a T, V or Y shape such that each arm supports the coupler link at two coupler joins.

The arms 26 are permitted to pivot about linkage axes 30 (best shown in FIGS. 2 and 3) passing through each join 28, such that pivoting movement of an arm 26 relative to the frame link 24 rotates the coupler link 22 about a moving virtual pivot 32 (best shown in FIG. 3). The moving virtual pivot is defined by the point at which a line drawn along an arm 26 and passing through the respective frame join 28*a* and the respective coupler join 28*b* meets a line drawn along the other arm 26 passing through its respective frame join 28*a* and the respective coupler join 28*b*. Permitting rotation of the coupler link 22 (and therefore of the head 16) about the virtual pivot 32 by means of this four-bar linkage 20 means that the point of rotation of the head 16 (i.e. the virtual pivot 32) can be brought closer to the skin which provides for more comfortable conformance to the object being shaved.

In this example, each of the coupler joins 28*b* connecting the coupler link 22 to the arms 26 are one-degree-of-freedom joins 28*b*, such that there are four one-degree-of-freedom joins 28*b* in total, which permit the coupler link 22 to pivot relative to the respective arm 26 about the respective linkage axis 30. Each one-degree-of-freedom join 28*b* permits rotation about at least one axis (i.e. one-degree of freedom of rotation).

The coupler link 22 is coupled to the arms 26 at the coupler joins 28*b* by semi-annular bearing elements 36 mounted to the coupler link 22 comprising a semi-annular bearing surface (best shown in FIG. 2) curved about the linkage axis 30. There are four semi-annular bearing elements 36 in this example, and each arm 26 comprises a bearing recess 38 at each end of the U-shape (i.e. at each coupler join 28*b*), with each bearing recess 38 being configured to receive a respective bearing element 36. The bearing recesses 38 cooperate with the respective bearing elements 36 to permit pivoting movement between the coupler link 22 and the arm 26 about the respective linkage axis 30.

In this example, the frame joins 28*a* are two-degree-of-freedom joins 28*a* which permit the arms 26 to further pivot relative to the frame link 24 about a rotation axis 34 (best shown in FIG. 2). In this example, the rotation axis 34 is perpendicular to the linkages axes 30. In some examples, the rotation axis may have a component in a direction perpendicular to the linkage axes, in other words the rotation axis is not parallel to the linkage axes 30. The two-degree-of-freedom joins 28*a* therefore permit relative rotation of two respective connected bars about at least two perpendicular axes (i.e. two degrees of freedom of rotation in a single join).

Since the coupler link 22 is connected to both of the arms 26, the arms 26 together with the coupler link 22 can pivot in unison about the rotation axis 34. In other words, the coupler link 22 and the arms 26 can pivot about the rotation axis 34 without changing orientation relative to one another.

The two-degree-of-freedom joins 28*a* in this example are ball-and-socket joins 28*a* (best shown in FIG. 2). The frame link 24 is therefore coupled to the arms 26 by respective ball-and-socket joins 28*a*, where each ball-and-socket join 28*a* comprises a ball 42 and a socket 44 to receive the ball 42. In this example, the ball 42 for each ball-and-socket join 28*a* is mounted to the frame link 24, where the balls 42 are spaced apart along the rotation axis 34, and each arm 26 comprises a respective socket 44. In some examples, the balls may be mounted on the arms, and the frame link may comprise the corresponding sockets, spaced apart along the rotation axis. In other examples, one ball may be mounted on the frame and the corresponding arm may comprise a socket, and one socket may be disposed in the frame, and the corresponding arm may comprise a ball, such that the four-bar linkage could only be assembled in one way.

Since the arms 26 and the coupler link 22 are pivoted about the rotation axis 34 in unison, the absolute direction of the linkages axes 30 also rotates about the rotation axis 34. Since the ball-and-socket joins 28*a* are spaced apart long the rotation axis 34, at any one position, the ball-and-socket joins 28*a* permit pivoting movement about only the linkage axes 30 and the rotation axis 34.

Figure 4:
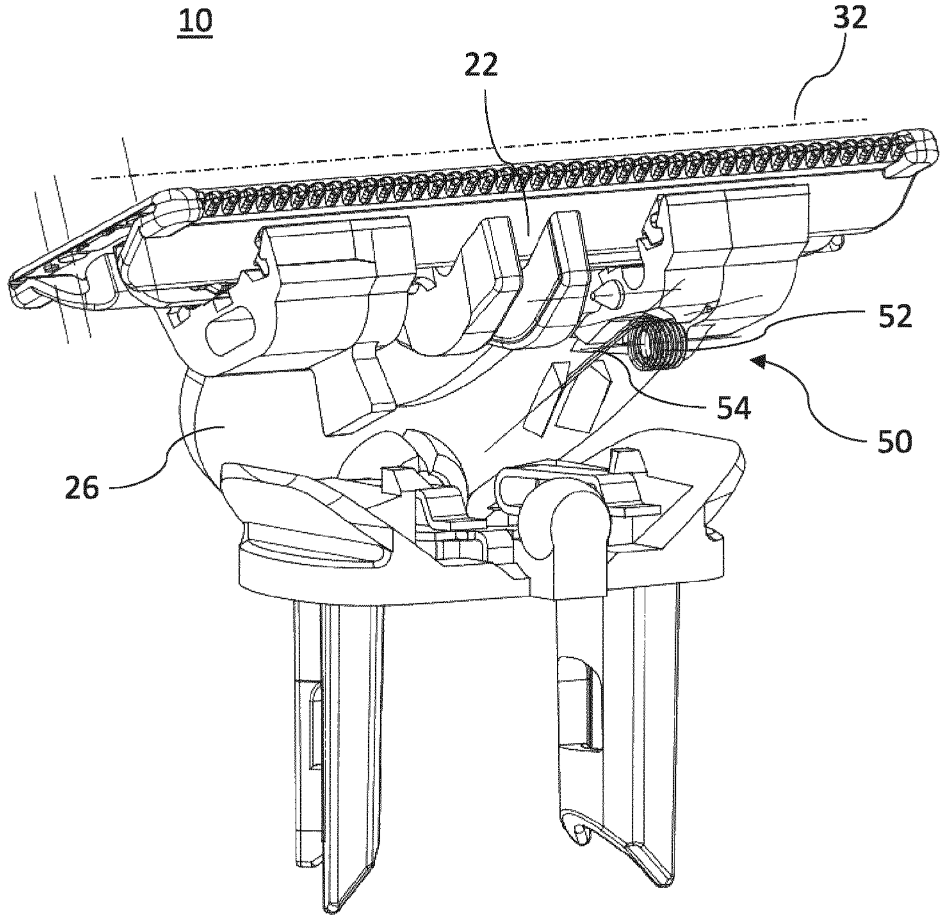
FIG. 4 schematically shows a first cutaway section of the hair cutting appliance.

FIG. 4 shows a first cutaway view of the hair cutting appliance 10 with one of the arms 26 removed.

It shows a first biasing mechanism 50 which is configured to bias the coupler link 22 to a first equilibrium position about the virtual pivot 32. The first biasing mechanism comprises a torsion spring 52 mounted to the coupler link 22 with an extension 54 of the torsion spring 52 connected to an arm 26. Therefore, when the coupler link 22 is pushed by a force during use to rotate away from the first equilibrium position about the virtual pivot 32, the torsion spring 52 urges the coupler link 22 back to the first equilibrium position when the force pushing it away from the first equilibrium position is removed.

Referring back to FIG. 3, in this example, one bearing element 36 comprises a bearing stop 40 which is configured to abut against an arm 26 to limit pivoting movement of the arm 26 relative to the coupler link 22 about the respective linkage axis 30. In this example, the bearing stop 40 is configured to abut against the arm 26 at ±10 degrees from the first equilibrium position. It will be appreciated that, in other examples, the bearing stop may be configured to abut against the arm at any suitable angle to limit pivoting movement of the arm relative to the coupler link about the respective linkage axis.

Limiting pivoting movement of the arm 26 also limits the rotation of the coupler link 22 relative to the frame link 24, thereby limiting rotation of the head 16 relative to the body 18 about the virtual pivot 32. In some examples, there may be more than one bearing stop. In other examples, the bearing stop may be disposed on the head.

Figure 5:
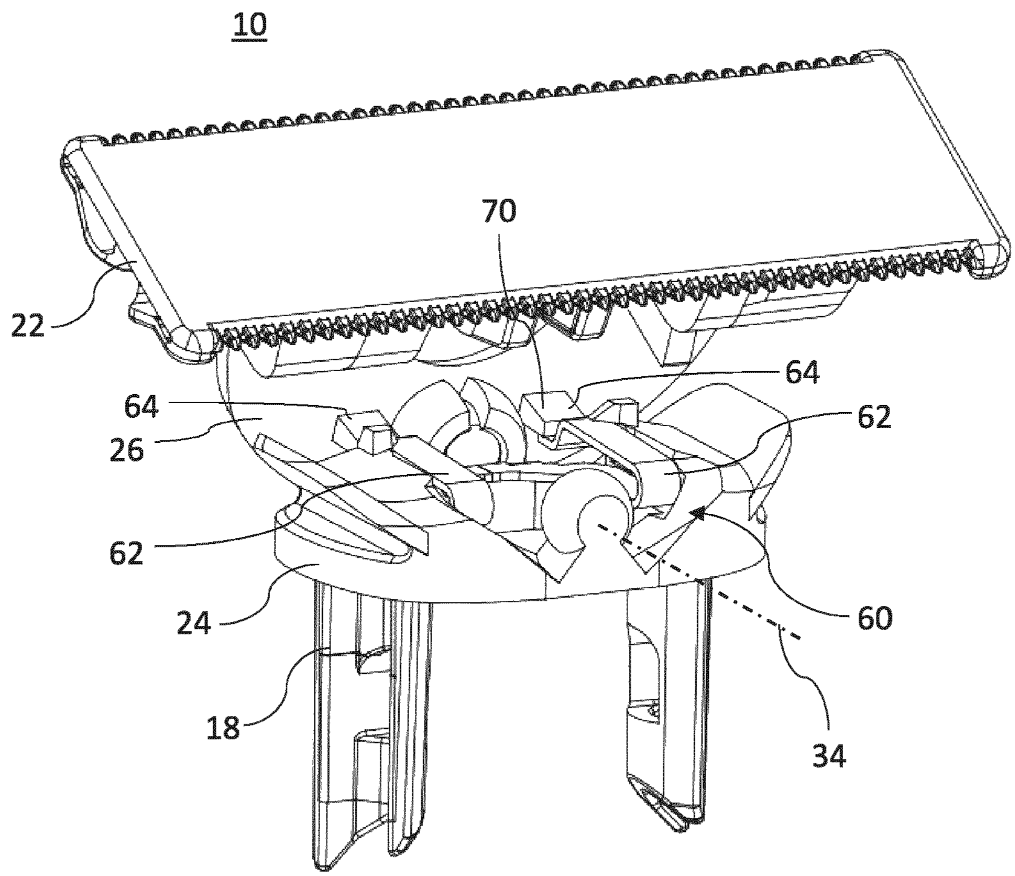
FIG. 5 schematically shows a second cutaway section of the hair cutting appliance.

FIG. 5 shows a second cutaway view of the hair cutting appliance 10 with one of the arms 26 removed.

It shows a second biasing mechanism 60 which is configured to bias the arms 26 and the coupler link 22 in unison to a second equilibrium position, about the rotation axis 34 relative to the frame link 24.

The second biasing mechanism 60 comprises a pair of leaf springs 62 mounted to the frame link 24 on either side of a respective frame join 28*a*. The leaf springs 62 are spaced apart along an axis perpendicular to the rotation axis 34, on either side of the rotation axis 34. An extension of each leaf spring 62 is received in an arm 26 to bias the arm 26 to the second equilibrium position. Since the coupler link 22 is connected to the arm 26 in which the leaf springs 62 are received, and the other arm 26 is connected to the coupler link 22, the coupler link 22 and both arms 26 are biased to the second equilibrium position by the leaf springs 62.

In this example, the arm 26 comprises a pair of protrusions 64, each of which receives an extension of the respective leaf spring 62 hooked under the protrusion 64 between the frame link 24 and the protrusion 64. In some examples, the extensions of the leaf springs may be fixed to the arms. In other examples, the leaf springs may be mounted to an arm and the extensions of the leaf springs received in the frame link to bias the arm to the second equilibrium position. In still other examples, each leaf spring may be received in, or mounted to, a different arm.

The four-bar linkage 20 in this example comprises a body stop 70 configured to abut against the frame link 24 to limit pivoting movement of the arms 26 and the coupler link 22 in unison about the rotation axis 34. In this example, the body stop 70 comprises the protrusions 64 of the arm 26 which are configured to abut the frame link 24 to limit pivoting movement. In this example, the protrusions 64 are configured to abut the frame link 24 at ±10 degrees from the second equilibrium position. It will be appreciated that the protrusions may be configured to abut the frame link at any suitable angle to limit pivoting movement about the rotation axis.

In some examples, the body stop may be configured to abut the body to limit pivoting movement of the arms and the coupler link in unison about the rotation axis. In other examples, the body stop may be disposed on the body or the frame link, and may be configured to abut an arm.

Although it has been described in the examples above that the frame joins 28*a* between the frame link 24 and the arms 26 are two-degree-of-freedom joins, and the coupler joins 28*b* between the coupler link 22 and the arm 26 are one-degree-of-freedom joins, in other examples, the orientation of the arms may be inverted so that the frame joins may be one-degree-of-freedom joins, and the so that there may be only two coupler joins which may be two-degree-of-freedom joins.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A mounting assembly for a hair cutting appliance, the mounting assembly comprising:

a head for receiving a cutting unit; and a body;

wherein the head is mounted to the body by a four-bar linkage having a coupler link associated with the head, a frame link associated with the body, and two arms extending therebetween, the frame link connected to each arm at respective joins, and the coupler link connected to each arm at respective joins, wherein pivoting movement of the arms about parallel linkage axes passing through each join permits rotation of the coupler link relative to the frame link about a virtual pivot;

wherein one of the coupler link and the frame link is a first link, and the other of the coupler link and the frame link is a second link, wherein the first link is coupled to the arms by two-degree-of-freedom joins, thereby permitting the arms and the second link to further pivot in unison relative to the first link about a rotation axis having a component in a direction perpendicular to the linkage axes.

2. The mounting assembly according to claim 1, wherein the frame link is the first link coupled to the arms by the two-degree-of-freedom joins, thereby permitting the arms and the coupler link to pivot in unison relative to the frame link about the rotation axis.

3. The mounting assembly according to claim 2, wherein the coupler link is coupled to the arms by respective semi-annular bearing elements mounted to the coupler link, wherein each of the arms comprise a bearing recess configured to receive a respective one of the semi-annular bearing elements and to cooperate with the respective one of the semi-annular bearing elements to permit pivoting movement between the coupler link and the arm about the respective linkage axis.

4. The mounting assembly according to claim 3, wherein at least one of the semi-annular bearing elements comprises a bearing stop which is configured to abut against the respective arm to limit pivoting movement of the arm relative to the coupler link about the linkage axis to thereby limit rotation of the head relative to the body about the virtual pivot.

5. The mounting assembly according to claim 2, wherein the two-degree-of-freedom joins comprise ball-and-socket joins for permitting the arms and the coupler link to pivot in unison relative to the frame link about the rotation axis.

6. The mounting assembly according to claim 5, wherein a ball of each ball-and-socket join is mounted to the frame link, wherein each of the arms comprise a socket to receive the respective ball to permit the arms and the coupler link to pivot in unison relative to the frame link about the rotation axis.

7. The mounting assembly according to claim 6, wherein the four-bar linkage comprises a body stop, wherein the body stop is configured to abut against one of the body, the frame link or at least one of the arms to limit pivoting movement of the arms and the coupler link in unison about the rotation axis.

8. The mounting assembly according to claim 1, wherein each arm comprises at least two diverging strands to form a T, V, U or Y shape, such that each arm is coupled to the coupler link at two points, spaced apart along an axis parallel to the linkage axes.

9. The mounting assembly according to claim 1, comprising a first biasing mechanism configured to bias the coupler link to a first equilibrium position about the virtual pivot.

10. The mounting assembly according claim 9, wherein the first biasing mechanism comprises a torsion spring mounted to the coupler link, and an extension of the torsion spring connected to a respective one of the arms.

11. The mounting assembly according to claim 1, comprising a biasing mechanism configured to bias the arms and the coupler link in unison, about the rotation axis with respect to the frame link, to an equilibrium position.

12. The mounting assembly according to claim 11, wherein the biasing mechanism comprises a pair of leaf springs mounted to the frame link on either side of a respective one of the joins between the frame link and a respective one of the arms, each leaf spring being received in the respective arm to bias the arm to the equilibrium position.

13. The mounting assembly according to claim 1, wherein the rotation axis is perpendicular to the linkage axes.

14. A hair cutting appliance comprising the mounting assembly according to claim 1; and a cutting unit mounted to the head.

15. A kit of parts for making the mounting assembly according to claim 1, the kit of parts comprising:

the head and an associated coupler link;

the body and an associated frame link; and the arms of the four-bar linkage, wherein the arms, the frame link and the coupler link are configured to couple the arms to the coupler link at respective joins and to the frame link at respective joins to permit pivoting movement about respective parallel linkage axes passing through each respective join, and wherein one of the frame link and the coupler link is a first link, wherein the first link and the arms are configured to be coupled together by two-degree of freedom joins, thereby permitting the arms and the other of the coupler link and the frame link to further pivot in unison relative to the first link about the rotation axis.

16. A mounting assembly for a hair cutting appliance, the mounting assembly comprising:

a head for receiving a cutting unit;

a body; and a four-bar linkage configured to mount the head to the body, the four-bar linkage comprising a coupler link associated with the head, a frame link associated with the body, and two arms extending between the coupler link and the frame link, wherein the frame link is connected to each arm at respective frame joins, and the coupler link is connected to each arm at respective coupler joins, for allowing pivoting movement of the two arms about parallel linkage axes passing through each of the frame joins and the coupler joins, wherein the frame joins are two-degree-of-freedom joins, thereby permitting the arms and the coupler link to further pivot in unison relative to the frame link about a rotation axis having a component in a direction perpendicular to the linkage axes.

17. The mounting assembly of claim 16, wherein the coupler joins are one-degree-of-freedom joins.

18. The mounting assembly of claim 16, wherein the two-degree-of-freedom joins comprise ball-and-socket joins.

19. A mounting assembly for a hair cutting appliance, the mounting assembly comprising:

a head for receiving a cutting unit;

a body; and a four-bar linkage configured to mount the head to the body, the four-bar linkage comprising a coupler link associated with the head, a frame link associated with the body, and two arms extending between the coupler link and the frame link, wherein the frame link is connected to each arm at respective frame joins, and the coupler link is connected to each arm at respective coupler joins, for allowing pivoting movement of the two arms about parallel linkage axes passing through each of the frame joins and the coupler joins, wherein the coupler joins are two-degree-of-freedom joins, thereby permitting the arms and the frame link to further pivot in unison relative to the coupling link about a rotation axis having a component in a direction perpendicular to the linkage axes.

20. The mounting assembly of claim 19, wherein the frame joins are one-degree-of-freedom joins.

* * * * *